(12) United States Patent
Chigurupati et al.

(10) Patent No.: US 10,469,446 B1
(45) Date of Patent: Nov. 5, 2019

(54) SUBSCRIBER-AWARE NETWORK ADDRESS TRANSLATION

(71) Applicant: Juniper Networks, Inc., Sunnyvale, CA (US)

(72) Inventors: Prasad Chigurupati, Bangalore (IN); Arun S. G., Bangalore (IN); Nagaraj S. Turaiyur, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 256 days.

(21) Appl. No.: 15/277,986

(22) Filed: Sep. 27, 2016

(51) Int. Cl.
*H04L 29/08* (2006.01)
*H04W 40/00* (2009.01)
*H04L 29/12* (2006.01)

(52) U.S. Cl.
CPC ........ *H04L 61/256* (2013.01); *H04L 61/2015* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 6,006,269 A | 12/1999 | Phaal | |
| 6,571,287 B1 | 5/2003 | Knight et al. | |
| 6,687,245 B2 | 2/2004 | Fangman et al. | |
| 7,058,973 B1 | 6/2006 | Sultan | |
| 7,184,437 B1 | 2/2007 | Cole et al. | |
| 7,194,767 B1 | 3/2007 | Boydstun et al. | |
| 7,246,178 B2 | 7/2007 | Roberts et al. | |
| 7,346,044 B1 | 3/2008 | Chou et al. | |
| 7,386,628 B1 | 6/2008 | Hansell et al. | |
| 7,624,195 B1 | 11/2009 | Biswas et al. | |
| 7,649,912 B2 | 1/2010 | Balasubramanian et al. | |
| 7,804,785 B2 | 9/2010 | Roberts et al. | |
| 7,821,958 B2 | 10/2010 | Smith et al. | |
| 7,876,790 B2 | 1/2011 | Cho et al. | |
| 7,990,909 B2 | 8/2011 | Brueckheimer | |
| 8,018,972 B2 | 9/2011 | Roberts et al. | |
| 8,031,747 B2 | 10/2011 | Barry et al. | |
| 8,050,559 B2 | 11/2011 | Sindhu | |
| 8,259,571 B1 | 9/2012 | Raphel et al. | |

(Continued)

FOREIGN PATENT DOCUMENTS

| CN | 101742633 A | 6/2010 |
|---|---|---|
| CN | 102148767 A | 8/2011 |

(Continued)

OTHER PUBLICATIONS

"Junos OS—Security Configuration Guide," Juniper Networks, Inc., Mar. 9, 2012, 1804 pages.

(Continued)

*Primary Examiner* — Natisha D Cox
(74) *Attorney, Agent, or Firm* — Shumaker & Sieffert, P.A.

(57) ABSTRACT

Techniques are described for performing subscriber-aware NAT functions. In one example, routers or other NAT-enabled devices deployed within a network are configured to auto-correlate subscriber information with NAT operations performed by the devices when forwarding network traffic. As such, the techniques offload the burden of correlating subscriber login activity with NAT operations as typically performed by offline NAT log archive systems.

16 Claims, 3 Drawing Sheets

(56) References Cited

U.S. PATENT DOCUMENTS

| | | | |
|---|---|---|---|
| 8,270,438 B2 | 9/2012 | Barry et al. |
| 8,274,979 B2 | 9/2012 | Bragagnini et al. |
| 8,275,087 B2 | 9/2012 | Hadzic et al. |
| 8,300,749 B2 | 10/2012 | Hadzic et al. |
| 8,325,616 B2 | 12/2012 | Huang et al. |
| 8,339,959 B1 | 12/2012 | Moisand et al. |
| 8,391,271 B2 | 3/2013 | Mo et al. |
| 8,416,812 B2 | 4/2013 | Radulescu |
| 8,427,963 B2 | 4/2013 | Zampetti et al. |
| 8,458,338 B2 | 6/2013 | Karino et al. |
| 8,494,011 B2 | 7/2013 | Barry et al. |
| 8,553,542 B1 | 10/2013 | Szabo et al. |
| 8,571,008 B2 | 10/2013 | Kim et al. |
| 8,588,258 B2 | 11/2013 | Le Pallec et al. |
| 8,630,315 B2 | 1/2014 | Rivaud et al. |
| 8,650,279 B2 | 2/2014 | Mehta et al. |
| 8,656,052 B2 | 2/2014 | Carothers |
| 8,670,459 B2 | 3/2014 | Barry et al. |
| 8,701,179 B1 | 4/2014 | Penno et al. |
| 8,730,868 B2 | 5/2014 | Yamada et al. |
| 8,750,356 B2 | 6/2014 | Wang |
| 8,812,739 B2 | 8/2014 | Bryant et al. |
| 8,819,161 B1 | 8/2014 | Pannell et al. |
| 8,837,532 B2 | 9/2014 | Miyabe |
| 8,891,540 B2 | 11/2014 | Krishna et al. |
| 8,942,235 B1* | 1/2015 | Vinapamula Venkata ............... H04L 63/02 370/254 |
| 8,954,609 B1 | 2/2015 | Holleman et al. |
| 9,178,846 B1 | 11/2015 | Kamisetty et al. |
| 9,258,272 B1 | 2/2016 | Durand |
| 2001/0028651 A1 | 10/2001 | Murase |
| 2002/0138622 A1 | 9/2002 | Dorenbosch et al. |
| 2003/0058853 A1 | 3/2003 | Gorbatov et al. |
| 2003/0172145 A1* | 9/2003 | Nguyen ............... G06Q 10/10 709/223 |
| 2004/0071149 A1 | 4/2004 | Kim et al. |
| 2006/0029081 A1 | 2/2006 | Yan et al. |
| 2006/0245454 A1 | 11/2006 | Balasubramanian et al. |
| 2006/0248581 A1 | 11/2006 | Sundarrajan et al. |
| 2007/0043876 A1 | 2/2007 | Varga et al. |
| 2007/0162968 A1 | 7/2007 | Ferreira et al. |
| 2008/0013524 A1 | 1/2008 | Hwang et al. |
| 2008/0044181 A1 | 2/2008 | Sindhu |
| 2008/0107112 A1 | 5/2008 | Kuo et al. |
| 2009/0034672 A1 | 2/2009 | Cho et al. |
| 2009/0109983 A1 | 4/2009 | Dixon et al. |
| 2009/0129301 A1 | 5/2009 | Belimpasakis |
| 2009/0135837 A1 | 5/2009 | Mohaban |
| 2009/0168808 A1 | 7/2009 | Cho et al. |
| 2009/0185501 A1 | 7/2009 | Huang |
| 2010/0008260 A1 | 1/2010 | Kim et al. |
| 2010/0153560 A1 | 6/2010 | Capone et al. |
| 2010/0158051 A1 | 6/2010 | Hadzic et al. |
| 2010/0158181 A1 | 6/2010 | Hadzic |
| 2010/0158183 A1 | 6/2010 | Hadzic et al. |
| 2010/0175123 A1 | 7/2010 | Karina et al. |
| 2010/0214959 A1 | 8/2010 | Kuehnel et al. |
| 2010/0284405 A1 | 11/2010 | Lim |
| 2010/0329125 A1 | 12/2010 | Roberts et al. |
| 2011/0047256 A1* | 2/2011 | Babu ............... H04L 29/12367 709/223 |
| 2011/0122775 A1 | 5/2011 | Zampetti et al. |
| 2011/0150008 A1 | 6/2011 | Le Pallec et al. |
| 2011/0153869 A1 | 6/2011 | Bryant et al. |
| 2011/0196945 A1 | 8/2011 | Alkhatib et al. |
| 2011/0200051 A1 | 8/2011 | Rivaud et al. |
| 2011/0219123 A1 | 9/2011 | Yang et al. |
| 2011/0249682 A1 | 10/2011 | Kean et al. |
| 2012/0023257 A1 | 1/2012 | Vos et al. |
| 2012/0110194 A1 | 5/2012 | Kikkawa et al. |
| 2012/0170631 A1 | 7/2012 | Liu |
| 2012/0218999 A1* | 8/2012 | McDonald ............ H04L 43/026 370/392 |
| 2012/0250704 A1 | 10/2012 | Yamada et al. |
| 2012/0287948 A1 | 11/2012 | Ruffini et al. |
| 2012/0297089 A1 | 11/2012 | Carothers |
| 2012/0300859 A1 | 11/2012 | Chapman et al. |
| 2013/0039220 A1 | 2/2013 | Ruffini et al. |
| 2013/0054762 A1 | 2/2013 | Asveren |
| 2013/0067110 A1 | 3/2013 | Sarawat et al. |
| 2013/0080817 A1 | 3/2013 | Mihelic |
| 2013/0091303 A1 | 4/2013 | Mitra et al. |
| 2013/0103904 A1 | 4/2013 | Pangbom et al. |
| 2013/0121351 A1 | 5/2013 | Miyabe |
| 2013/0155945 A1 | 6/2013 | Chen |
| 2013/0166763 A1 | 6/2013 | Forsback |
| 2013/0208735 A1 | 8/2013 | Mizrahi et al. |
| 2013/0227008 A1 | 8/2013 | Yang |
| 2013/0259049 A1 | 10/2013 | Mizrahi |
| 2013/0283174 A1 | 10/2013 | Faridian et al. |
| 2013/0283175 A1 | 10/2013 | Faridian et al. |
| 2013/0301255 A1* | 11/2013 | Kim ............... F21V 23/06 362/218 |
| 2014/0136690 A1* | 5/2014 | Jain ............... H04L 41/5012 709/224 |
| 2014/0161143 A1 | 6/2014 | Mizrahi et al. |
| 2014/0211714 A1 | 7/2014 | Li et al. |
| 2014/0211780 A1 | 7/2014 | Kang et al. |
| 2014/0226984 A1 | 8/2014 | Roberts et al. |
| 2014/0304765 A1* | 10/2014 | Nakamoto ............ H04L 63/20 726/1 |
| 2015/0040238 A1 | 2/2015 | Sarsa Sarsa |
| 2015/0067171 A1* | 3/2015 | Yum ............... G06F 9/5072 709/226 |
| 2015/0071225 A1* | 3/2015 | Krishna ............ H04L 61/2528 370/329 |
| 2016/0080316 A1* | 3/2016 | Gonzalez Pizarro ............... H04L 61/2507 709/245 |
| 2016/0164699 A1 | 6/2016 | Ma |
| 2016/0164831 A1 | 6/2016 | Kim |

FOREIGN PATENT DOCUMENTS

| | | |
|---|---|---|
| JP | 4705656 B2 | 6/2011 |
| WO | 02076042 A1 | 9/2002 |
| WO | 2003096206 A1 | 11/2003 |

OTHER PUBLICATIONS

Audet et al., "Network Address Translation (NAT) Behavioral Requirements for Unicast UDP," RFC 4787, Network Working Group, IETF Trust, Jan. 2007, 30 pp.

Deering et al., "Internet Protocol, Version 6 (IPv6) Specification," RFC 2460, Network Working Group, The Internet Society, Dec. 1998, 39 pp.

Diel et al., "Characterizing TCP Resets in Established Connections," Technical Report CS-08-102, Computer Science Department, Colorado State University, Sep. 10, 2008, 10 pp.

Donley et al. Deterministic Address Mapping to Reduce Logging in Carrier Grade NATs, draft-donley-behave-delerministic-cgn-00, Network Working Group, Internet-Draft, IETF Trust, Sep. 26, 2011, 10 pgs.

Durand et al., "Dual-Stack Lite Broadband Deployments Following 1Pv4 Exhaustion," RFC 6333, Internet Engineering Task Force, IETF Trust, Aug. 2011, 32 pp.

Gaderer et al., "Improving Fault Tolerance in High-Precision Clock Synchronization," IEEE Transactions on Industrial Informatics, vol. 6, No. 2, May 2010, pp. 206-215.

Gont, "TCP's Reaction to Soft Errors," RFC 5461, Network Working Group, IETF Trust, Feb. 2009, 14 pp.

Guha et al., "NAT Behavioral Requirements for TCP," RFC 5382, Network Working Group, IETF Trust, Oct. 2008, 21 pp.

Harrington et al., "An Architecture for Describing Simple Network Management Protocol (SNMP) Management Frameworks," RFC 3411, Network Working Group, The Internet Society, Dec. 2002, 60 pp.

(56) References Cited

OTHER PUBLICATIONS

IEEE-SA Standards Board, "Standard for a Precision Clock Synchronization Protocol for Networked Measurement and Control Systems," IEEE Std 1588TM-2008, IEEE Instrumentation and Measurement Society, Jul. 24, 2008, 289 pp.

Lentz et al., "Precision Timing in the Neptune Canada Network," OCEANS 2009-EUROPE, IEEE, May 11-14, 2009, 5 pp.

Lenzen et al., "Optimal Clock Synchronization in Networks," Proceedings of the 7th ACM Conference on Embedded Networked Sensor Systems, ACM, Nov. 4, 2009, pp. 225-238.

Li, et al., "Global Clock Synchronization in Sensor Networks," IEEE Transactions on Computers, vol. 55, No. 2, Feb. 2006, pp. 214-269.

Nilsson et al., "Fast Address Lookup for Internet Routers," Proceedings of Algorithms and Experiments, Feb. 9-11, D 1998, pp. 9-18.

Penno et al., "Network Address Translation (NAT) Behavioral Requirements Updates," Internet Engineering Task Force Internet Draft, draft-penno-behave-rfc4787-5382-5508-bis-01, IETF Trust, Nov. 16, 2011, 11 pp.

Penno et al., "Stateless DS-Lite," Internet Engineering Task Force, draft-penno-softwire-sdnat-02, Mar. 11, 2012, 11 pp.

Postel et al., "Internet Protocol," RFC 791, Internet Engineering Task Force, Sep. 1981, 49 pp.

Schenato et al., "A Distributed Consensus Protocol for Clock Synchronization in Wireless Sensor Network," 46th IEEE Conference on Decision and Control, IEEE, Dec. 12-14, 2007, 6 pp.

Srisuresh et al., "NAT Behavioral Requirements for ICMP," RFC 5508, Network Working Group, IETF Trust, Apr. 2009, 30 pp.

Sundararaman et al., "Clock Synchronization for Wireless Sensor Networks: a Survey," Ad Hoc Networks vol. 3, No. 3, Jan. 18, 2005, pp. 281-323.

U.S. Appl. No. 14/930,030, by Sarat Kamisetty, filed Nov. 2, 2015.

Weibel et al., "High Precision Clock Synchronization according to IEEE 1588 Implementation and Performance Issues," Zurich University of Applied Sciences, Institute of Embedded Systems (InES), 2005, 9 pp. "Applicant points put, in accordance with MPEP 609.04(a), that the year of publication, 2005, is sufficiently earlier than the effective U.S. Filing date, Nov. 2, 2015, so that the particular month of publication is not in issue."

Yamagata et al., "NAT444." Internet Engineering Task Force Internet Draft, draft-shirasaki-nat444-05, IETF Trust, Jan. 5, 2012, 10 pp.

* cited by examiner ated devices deployed within a network are configured to automatically correlate subscriber information with NAT operations performed by the devices when forwarding network traffic. As such, the techniques offload to the routers the task of correlating subscriber login activity with NAT operations as typically performed by offline NAT log archive systems. This may enable improved scalability for service provider networks.

SUBSCRIBER-AWARE NETWORK ADDRESS TRANSLATION

TECHNICAL FIELD

The invention relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to subscriber equipment (e.g., cable modems, DSL modems, mobile devices) utilized by their customers. For example, a DHCP server or Radius server may dynamically assign a private address to a subscriber equipment upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by each subscriber equipment to public network addresses that are routable within a public network, such as the Internet.

Service providers are sometimes required by law enforcement to be able to identify a particular customer that is associated with particular network traffic at a particular time and day. As a result, service provides are typically required to maintain information such that any given network address that sourced or received certain traffic can be traced back to the particular customer. As a result, service providers typically deploy a Carrier Grade NAT (CGN) archive system that maintains archives of NAT system log files ("syslog"). Each syslog file stores by the CGN archive system potentially a significant amount of information including each subscriber login and, for each login, the private source IP address, the private source port, any VPN information of the subscriber, tunneling information, any NAT rules/terms, public IP address and port assigned to the subscriber. As such, in a typical service provider network, the CGN archive system is tasked with burden of correlating subscriber login and address allocation information from databases of, for example, the AAA server or access gateway with network address translation information from routers or NAT devices forwarding network traffic within the subscriber network. This correlation can present significant challenges and burdens in certain environments, such as large service provider networks where session setup rate is typically very high with tens of millions of sessions being established and torn down each day across the network.

SUMMARY

In general, techniques for subscriber-aware network address translation (NAT) are described. In one example, techniques are described in which routers or other NAT-enabled devices deployed within a network are configured to automatically correlate subscriber information with NAT operations performed by the devices when forwarding network traffic. As such, the techniques offload to the routers the task of correlating subscriber login activity with NAT operations as typically performed by offline NAT log archive systems. This may enable improved scalability for service provider networks.

In one example, a method comprises receiving, with a router, a network access request from a subscriber device of a service provider network, wherein the subscriber device is associated with a subscriber of the service provider network. The method further comprises, upon authenticating the subscriber, installing a subscriber identifier within a service unit of a data plane of the router, wherein the subscriber identifier uniquely identifies the specific subscriber from a plurality of subscribers of the service provider network. The method includes responsive to a packet flow associated with the subscriber device, performing one or more network address translation (NAT) operations by a NAT element within one of the service units of the data plane of the router, generating, within the service unit of the data plane of the router, one or more records logging the NAT operations, where in the records correlate the NAT operations with the subscriber by identifying the NAT operations and including the identifier of the subscriber; and outputting the records from the data plane of the router to an archive system.

As another example, a router includes a data plane having packet forwarding hardware configured to forward transit packets and at least one service unit coupled to the packet forwarding hardware. The router includes a control unit configured to receive a network access request from a subscriber device of a service provider network and authenticate a subscriber associated with the subscriber device. Upon authenticating the subscriber, the control unit is configured to install a subscriber identifier within a service unit of a data plane of the router, the subscriber identifier uniquely identifying the specific subscriber from a plurality of subscribers of the service provider network. Responsive to a packet flow associated with the subscriber device, the service unit is configured to perform one or more network address translation (NAT) operations and generate, within the service unit of the data plane of the router, one or more records logging the NAT operations, where in the records correlate the NAT operations with the subscriber by identifying the NAT operations and including the identifier of the subscriber.

As another example, a system comprises a network configured to provide a plurality of subscriber devices access to a public network. The subscriber devices are associated with respective subscribers. A subscriber management system of the network includes a subscriber database having profiles for each of the subscribers, and each of the subscribers is uniquely identified in the subscriber management system by a corresponding subscriber identifier. An archive system stores records of network address translation (NAT) operations performed on packet flows within the network, wherein the records stored by the archive system are correlated with the subscriber identifiers such that each of NAT operations specified by the records can be associated with a respective one of subscribers. A router deployed within the network is configured to receive a network access request from a subscriber device of a service provider network, wherein the subscriber device is associated with a subscriber of the service provider network. In addition, the router, upon authenticating the subscriber with the subscriber management system, installs the subscriber identifier of the subscriber within a service unit of a data plane of the router. Responsive to a packet flow associated with the subscriber device, the router performs one or more NAT operations by a NAT element within one of the service units of the data plane of the router, generates, within the service unit of the data plane of the router, one or more records logging the NAT operations, wherein the records correlate the NAT operations with the subscriber by identifying the NAT operations and including the identifier of the subscriber. In response to a triggering event, the router outputs the records to the archive system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
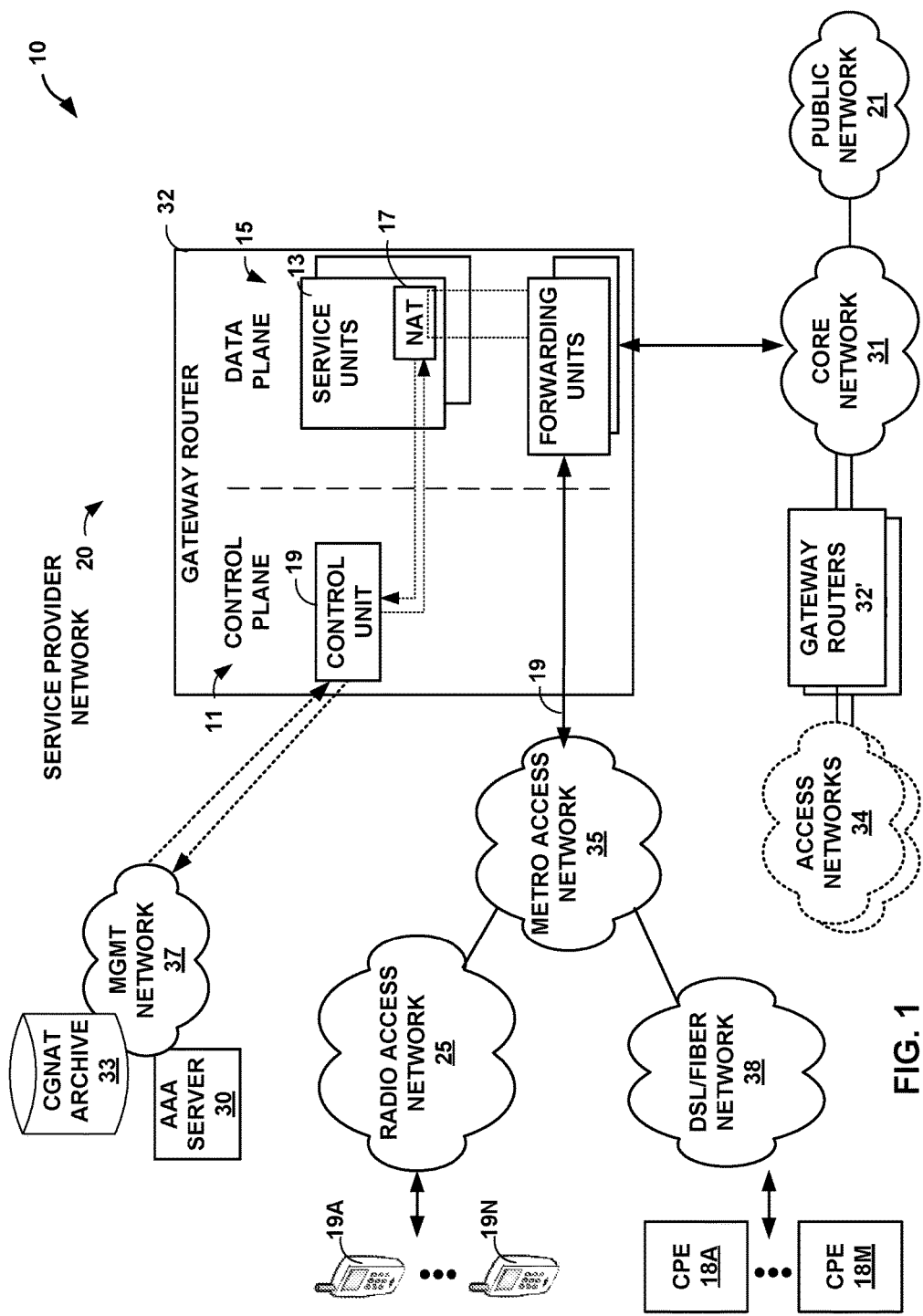
FIG. 1 is a block diagram illustrating an example network system that implements the network address translation techniques described in this disclosure.

FIG. 1 is a block diagram illustrating an example network system 10 that implements the network address translation techniques described in this disclosure. As shown in the example of FIG. 1, network system 10 includes a service provider network 20 that provides network connectivity to a public network 21. In the example of FIG. 1, service provider network 20 operates as a private network that provides packet-based network access to customer premise equipment ("CPEs") 18A-18M that service endpoint computing devices, such as personal computers, laptop computers or other types of computing device associated with subscribers. As another example, service provider network 20 may provide data services to cellular mobile devices 19A-19N. Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, CPEs 18 connect to a broadband network gateway (BGW) 32 via an DSL/Fiber network 38 and metro access network 35, which may comprise high-speed interconnects, network switches and other infrastructure. In one example, CPEs may be DSL modems and DSL/Fiber network 28 may comprise a digital subscriber line access multiplexer (DSLAM) or other switching device(s). Other embodiments may use other links besides DSL lines, such as optical fiber, cable, Ethernet over a T1, T3 or other access links. In other examples, CPE's may be enterprise equipment, Internet of Things (IoT) devices or other devices.

Service provider network 20 may also include or otherwise connect to radio access network 25 in which one or more base stations communicate via radio signals with mobile devices 19. Radio access network 25 is a transport network that enables base stations to exchange packetized data with core network 31 of the service provider, ultimately for communication with packet data network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway router 32 via metro access network 35.

In general, gateway router 32 provides access, by mobile devices 19 and CPEs 18, to core network 31 of the service provider network and ultimately to public network 21. In similar manner, other gateway routers 32' may be deployed to provide network access to customer endpoint devices (not shown) coupled to additional access networks 34. Core network 31 may comprise, for instance, a general packet radio service (GPRS) core packet-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

In general, service provider network 20 includes a management network 37 having resources for managing the customers of the service provider along with the infrastructure of the service provider network. AAA server 30, for example, represents a subscriber management system for the service provider network and is typically an authentication, authorization and accounting (AAA) server to authenticate the credentials of a subscriber requesting a network connection. In general, AAA server 30 maintains a subscriber database having profiles for each of the subscribers, including login credentials. Each of the subscribers is uniquely identified in the subscriber management system by a corresponding subscriber identifier. Although shown separately, AAA server 30 may be integrated within a router or gateway of broadband network or on a separate network device and may be, for example, a Remote Authentication Dial-In User Service (RADIUS) server. Upon authenticating a network login request from either a CPE 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway router 32). Typically, upon authentication of the subscriber, AAA server 30 selects a private IP address from a pool of private network addresses. In some cases, gateway router 32 may send a Radius authentication request to AAA server 30 for authentication and assignment of a private IP address.

As shown in FIG. 1, gateway router 32 includes a number of components that may logically be grouped within a control plane 11 and a data plane 15. For example, control plane 11 includes a control unit 19 operating as a controller, such as execution of high level routing protocols, chassis management, subscriber authentication and the like. Upon authenticating subscribers, control unit 19 distributes responsibility for processing packets associated with subscriber sessions to service units 13. That is, control unit 19 selects an associated one of service units 13 for performing network services, including network address translation (NAT) 17, when forwarding transit packets for packet flows of the given subscriber session.

In general, a respective NAT element 17 within the selected subscriber management unit provides network address translation for private network addresses routable within the service provider network to public network addresses routable within core network 31 and public network 21. As one example, NAT element 17 applies a source network address and port translation (NAPT) mechanism for subscriber data traffic 19 forwarded within data plane 15. For example, when routing outbound packets of subscriber data traffic 19, from metro access network 35 destined for a destination address within public network 21, NAT element 17 applies a binding that maps private source addresses of the outbound packets to public addresses and ports. NAT element 17 performs network address translation to translate the private source network address within the packet to the public network address and port number bound to the particular subscriber communication session. During this process, NAT element 17 may replace all or a portion of a header (e.g., IP or UDP header) of the packet prior to forwarding the packet to public network 12. Upon receiving an inbound packet from public network 21 via core network 31, NAT element 17 identifies a current NAT entry for the communication session and maps the public destination network address and the destination port to the corresponding private network address and port. NAT element 17 may then replace all or a portion of a header (e.g., IP or UDP header) within the packet prior to forwarding the packet to metro access network 31.

In this way, NAT element 17 is configured to perform NAT operations as subscriber traffic 19 is forwarded within the data plane 15. As described herein, gateway router 32 may be configured to perform subscriber-aware network address translation (NAT). For example, as described herein, control unit 19 configures NAT element 17 of each of service units 13 to auto-correlate subscriber information with NAT operations when forwarding network traffic within the data plane. For example, upon interacting with AAA server 30 to receive authentication information for a subscriber, including any dynamically allocated private network address or subscriber identifier, control unit 19 programs NAT element 17 with subscriber identification information, such as a customer ID. In turn, when subsequently forwarding subscriber traffic, NAT element 17 generates and, optionally, temporarily caches NAT logs in which NAT operations performed by NAT element 17 when processing transit data packets are correlated with the corresponding subscriber information. That is, when performing NAT operations, NAT elements 17 of service units 13 determine the subscriber identity associated with the packet flow and generates the NAT logs of data plane activity that already include at least some data or identifier that provides the identification of the subscriber associated with the packet flow. NAT element 17 reports the pre-correlated NAT logs to control unit 19 for communication to an external archive, such as Carrier Grade NAT ('CGNAT') archive 33 for long term storage. Reporting of the pre-correlated NAT logs by NAT elements 17 of data plane 15 may be based on time (periodic), threshold (cached data size), time of day or other criteria or an external request such as a polling request from CGNAT archive 33.

As such, the techniques described herein offload the burden of correlating subscriber login activity with NAT operations, as typically performed by offline NAT log archive systems, to NAT devices, such as router 32, deployed within service provider network 20. This may provide increased scalability for service provider network 20, and may allow syslog operators to elect not to use deterministic NAT or Port Block Allocation (PBA). This may provide more efficient use of public IP addresses and better security by avoiding predictable ports usage. The techniques may also provide subscriber-level NAT statistics for analytics and integration with other router functions, which may be useful for planning of public addresses for the network operator, deciding optimal port block size, identification of subscribers using maximum NAT resources (ports), and allows the operator to dynamically change parameters (e.g., using dynamic port allocation).

The techniques may be used with any of a variety of NAT algorithms. For example, when selecting NAT bindings for new subscriber sessions, NAT element 17 may apply deterministic NAT in which the address and port binding is precomputed or may use dynamic address and port selection by maintaining and utilizing a pool of public network addresses from which to allocate addresses.

Figure 2:
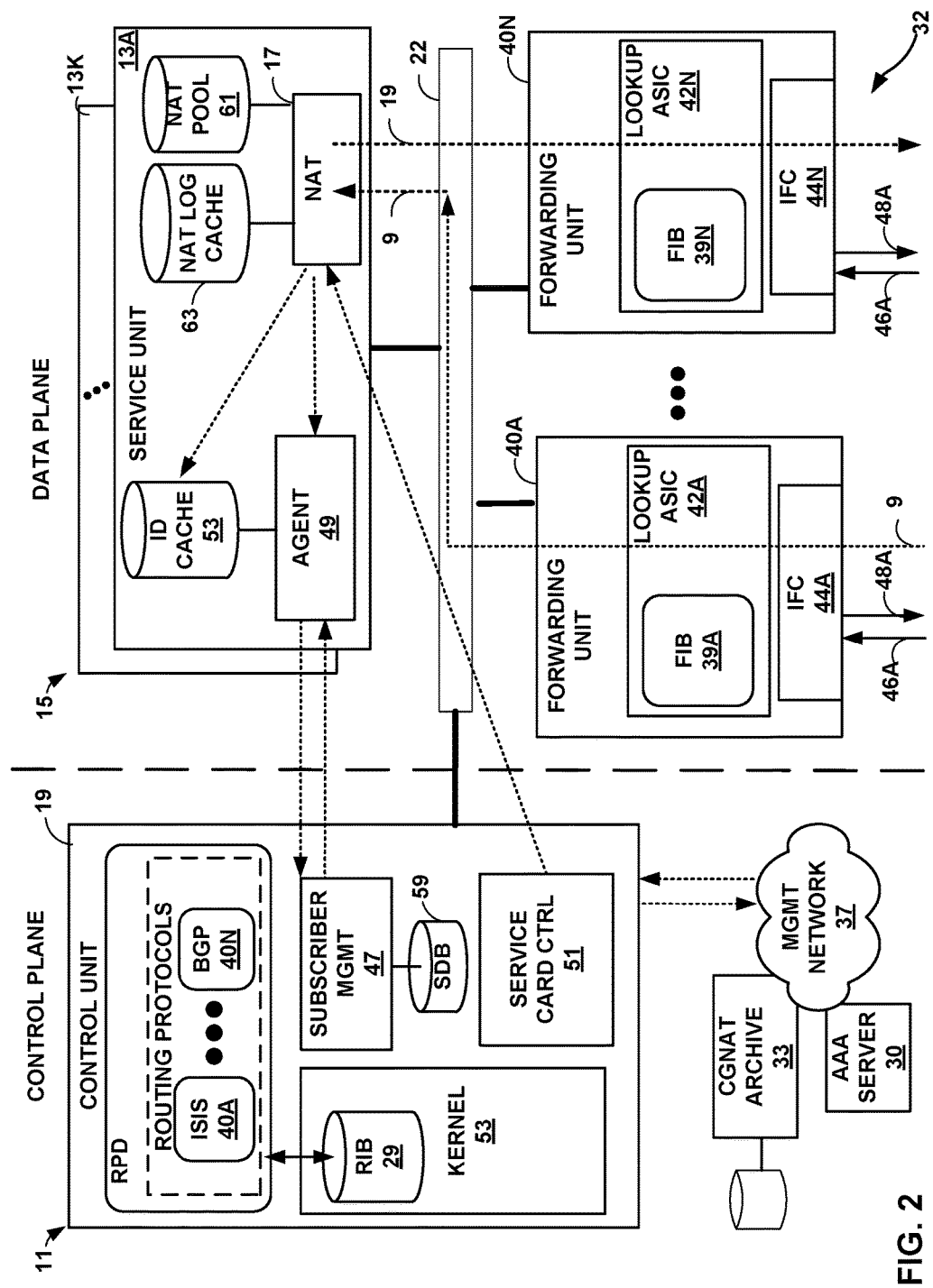
FIG. 2 illustrates an example gateway router that incorporates the NAT functions described herein.

FIG. 2 is a block diagram illustrating, in further detail, an example embodiment of gateway router 32 of FIG. 1 that incorporates the NAT functions described herein. In this example, gateway router 32 is divided into two logical or physical "planes" to include a control plane 11 that performs control operations for the device and a data plane 15 for forwarding transit network traffic. That is, gateway router 32 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 11 includes control unit 19, which executes the device management services, subscriber authentication and control plane routing functionality of gateway router 32. For, control unit 19 represents hardware or a combination of hardware and software of control that implements routing plane routing protocols 40A-40N ("routing protocols 40") by which routing information stored in a routing information base 29 ("RIB 29") may be determined. RIB 29 may include information defining a topology of a network, such as service provider network 20 of FIG. 1. Routing protocols 40 interact with kernel 53 (e.g., by way of API calls) executing on control unit 19 to update routing information base (RIB) 44 based on routing protocol messages received by gateway router 32. Control unit 19 may resolve the topology defined by routing information in RIB 29 to select or determine one or more routes through the network. For example, the kernel may generate forwarding information in the form forwarding information bases 39A-39N ("FIBs 39") based on the network topology represented in RIB 29, i.e., performs route resolution. For example, the kernel may determine the physical interface port to be used for the forwarding next hops. Routing unit 20 may then program forwarding units 40 of data plane 15 with FIBs 39, which installs the FIBs within lookup ASICs 42.

Data plane 15, in this example, is a decentralized data plane in that data plane functionality and packet forwarding functionality is distributed among a plurality of forwarding units 40A-40N ("forwarding units 40"). In the example of gateway router 32 of FIG. 2, data plane 15 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a gateway router 32 chassis or combination of chassis.

In addition, data plane 15 includes a plurality of service units 13A-13K ("service units 13 that may be, as examples, removable service cards, which are configured to apply network services to packets flowing through data plane 15.

Internal switch fabric 22 couples control unit 19, service units 13, and forwarding units 40 to deliver data units and control messages among the units. Switch fabric 22 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

As shown in the example of FIG. 2, each of forwarding units 40A-40N includes a respective lookup ASIC 42A-42N that receives control and data session traffic via IFC cards 44, performs route lookups and, based on the result according to internal routes installed to FIBs 39, forwards the traffic to control unit 19 (control traffic) or to one of forwarding units 40 (transit data traffic) for output via an interface to one of output links 48. In one example, lookup ASICs 42 are microcode-controlled chipsets programmably configured by a slave microprocessor executing on each of forwarding units 40. Specifically, one or more of lookup ASICs 42 is controllable by internal microcode programmed by the slave microprocessor. The slave microprocessor programs a corresponding FIB 39 into internal memory of each lookup ASICs 42 within the data plane 15.

When forwarding packets, control logic within each lookup ASICs 42 traverses FIB 39 and, upon reaching a FIB entry for the packet (e.g., a leaf node), the microcode-implemented control logic automatically selects one or more forwarding next hops (FNHs) for forwarding the packet. Lookup ASIC 42A may be implemented using a forwarding application specific integrated circuits (ASICs), field programmable gate arrays (FPGAs), or any other equivalent integrated or discrete logic circuitry, as well as any combinations of such components. Each of forwarding units 40 may include substantially similar components to perform substantially similar functionality, said components and functionality being described hereinafter with respect to forwarding unit 40A.

Each subscriber management unit 10 provides a computing environment for executing application of various packet-processing services 36, such as NAT element 17, to packet flows traversing forwarding plane 15. In this example, service card controller 51 of control unit 19 configures service cards 10 to perform packet processing operations within data plane 15. For example, service card controller 51 may configure respective NAT element 17 operable within service cards 10 to perform network address translation for particular flows as transit data packets are forwarded by data plane 15. Service card controller 51 may, for example, configure NAT element with one or more pools of network addresses (NAT pool 61) from which to allocate public network addresses when generating NAT bindings for newly detected packet flows. As packets are received by router 32 for packet flows, such as inbound packet flow 9, forwarding units 40 direct the packet flows to service cards 10, where NAT elements 17 of the service cards performs network address translation prior to outputting the packet flow on an output interface.

Subscriber management module 47 processes control plane packets for managing network sessions of with CPE devices 18 or mobile devices 19. For example, responsive to receiving a network access request, subscriber management module 47 may communicate with AAA server 30 to authenticate the subscriber and, upon authentication, receive from the AAA server any subscriber profile. The subscriber profile may include, for example, an indicator as to whether NAT is to be performed on the packet flows associated with the subscriber, any private network address dynamically allocated for the subscriber and, optionally, any additional subscriber identifier.

As shown in FIG. 2, in additional to updating master subscriber database 59 within control plane 11 so as to store profile information for authenticated subscribers, subscriber management module 47 installs the subscriber identification information within identification (ID) cache 53 within each of service cards 10. In this example, subscriber management module 47 communicates with a respective agent 49 within each service units 13 to write to cache 53 the subscriber identifiers, such as the private network address or other data that uniquely identifies the subscriber.

Upon processing an initial packet for a new communication session (packet flow), NAT element 17 dynamically creates a NAT binding for the new communication session. That is, NAT element 17 maintains an internal cache of NAT bindings for current subscriber communication sessions, where each communication can be uniquely identified, such as by a five tuple comprising a source network address and port, destination network address and port, and protocol. When processing an outbound packet having a destination address within public network 21, NAT element 17 accesses the NAT bindings to determine whether a NAT binding exists for the particular packet flow. Upon detecting an outbound packet from for a new packet flow, NAT element 17 determines the NAT binding based on the configuration information provided by service card controller 51. For example, if configured for dynamic NAT allocation, NAT element allocates a free public network address from NAT pool 61 and dynamically selects a port within an allocated port range for use with this particular communication session for the subscriber.

Upon assigning the public address and specific port, NAT element 17 updates its internal cache to record the NAT binding between the public address/port and the subscriber's private address/port for the packet flow. NAT element 17 similarly creates additional NAT bindings when processing initial packets for additional packet flows originating from or destined for the subscriber.

Upon determining the NAT binding for the new packet flow, NAT element 17 performs network address translation to translate the private source network address and source port within the outbound packet to the allocated public network address and assigned port number. Similarly, when processing outbound packets of subscriber data traffic 19 for an existing packet flow, NAT element 17 applies the corresponding NAT binding from its internal cache to map private source addresses of the outbound packets to public addresses and ports according to the binding. NAT element 17 performs network address translation to translate the private source network address within the packet to the public network address and port number bound to the particular subscriber communication session. During this process NAT element 17 may replace all or a portion of a header (e.g., IP or UDP header) of the packet prior to forwarding the packet to public network 12. When lookup ASIC 17 performs routing operations on an inbound packet from public network 12, NAT element 17 identifies a current NAT entry for the communication session and maps the public destination network address and the destination port to the corresponding private network address and port specified by the NAT binding. NAT element 17 may then replace all or a portion of a header (e.g., IP or UDP header) within the packet prior to forwarding the packet toward core network 31. Once NAT element 17 processes the first packet in a communication flow, NAT bindings for forward and reverse traffic are setup properly within its internal memory, and hence flow lookups for packets in that session will succeed. If the flow lookup succeeds, NAT or de-NAT action is performed using the existing NAT bindings and the packet is forwarded.

Moreover, in accordance with the techniques described herein, NAT element 17 accesses subscriber identification cache 53 when performing NAT operations and utilizes the cached subscriber identification to generate subscriber-aware NAT logs in which the NAT operations are correlated with the corresponding subscriber information. That is, when performing NAT operations, NAT element 17 determines the subscriber identifier associated with the particular packet flow, using subscriber information recognizable to external systems of the service provider such as AAA server 30, and generates the NAT logs to already include data or identifier that provides the identification of the subscriber associated with the packet flow. At this time, NAT element 17 may access subscriber identification cache 53 to determine the subscriber identifier for the subscriber (e.g., customer) associated with the particular packet flow and inserts a record within NAT log cache 63 to record the NAT activity in a subscriber-aware manner, i.e., subscriber correlated record.

For example, NAT element 17 may update the local NAT log cache 63 to record allocation of each new NAT binding of private IP/public IP & port for new network sessions. For example, upon receiving an initial packet from private IP 10.10.10.1, NAT element 17 may allocate a new NAT binding of public IP address 20.20.20.1/ports 1024-1380 for performing network address translation of subsequent packets for the sessions, and update the local, subscriber-aware NAT log within NAT log cache to include a record as follows:

>time stamp, sub1@globetelecom.com, binding allocated, Private IP 10.10.10.1 mapped to Public IP 20.20.20.1, port range 1024-1380, Subscriber ID=9944

As shown above, NAT element 17 includes within the NAT log record a particular identifier for the subscriber (Subscriber ID=9944) as obtained from the subscriber information written to ID cache 53 by subscriber management module 47. Similarly, upon terminating a stale network session and, as one example, freeing a NAT binding and returning a public address/port to a NAT pool, NAT element 17 may update the NAT logs to include a record as:

>time stamp, binding released, Private IP 10.10.10.1 mapped to Public IP 20.20.20.1, port range 1024-1380, Subscriber ID=9944

In this way, NAT elements 17 of service cards 10 within the dataplane of router 32 generate NAT logs that in which NAT operations, such as allocation and de-allocation of particular NAT bindings, are already correlated to specific subscriber identification information provided by the service provider's subscriber management system, such as AAA server 30.

NAT element 17 reports the pre-correlated NAT logs to control unit 19 via agent 49 for communication to CGNAT archive 33 for long term storage. Reporting of the pre-correlated NAT logs by NAT element 17 may be based on time (periodic), threshold (cached data size), time of day or other criteria (e.g., on subscriber logout). NAT element 17 may purge the cached NAT logs upon successfully reporting the NAT logs to CGNAT archive 33.

As such, the techniques described herein offload the burden of correlating subscriber login activity with NAT operations, as typically performed by offline NAT log archive systems, to NAT devices, such as router 32, deployed within service provider network 20. The techniques may be used with any of a variety of NAT algorithms. For example, when selecting NAT bindings for new subscriber sessions, NAT element 17 may apply deterministic NAT in which the address and port binding is precomputed or may use dynamic address and port selection by maintaining and utilizing a pool of public network addresses from which to allocate addresses.

Functionality described with respect to service cards 10 and control unit 19 may be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Figure 3:
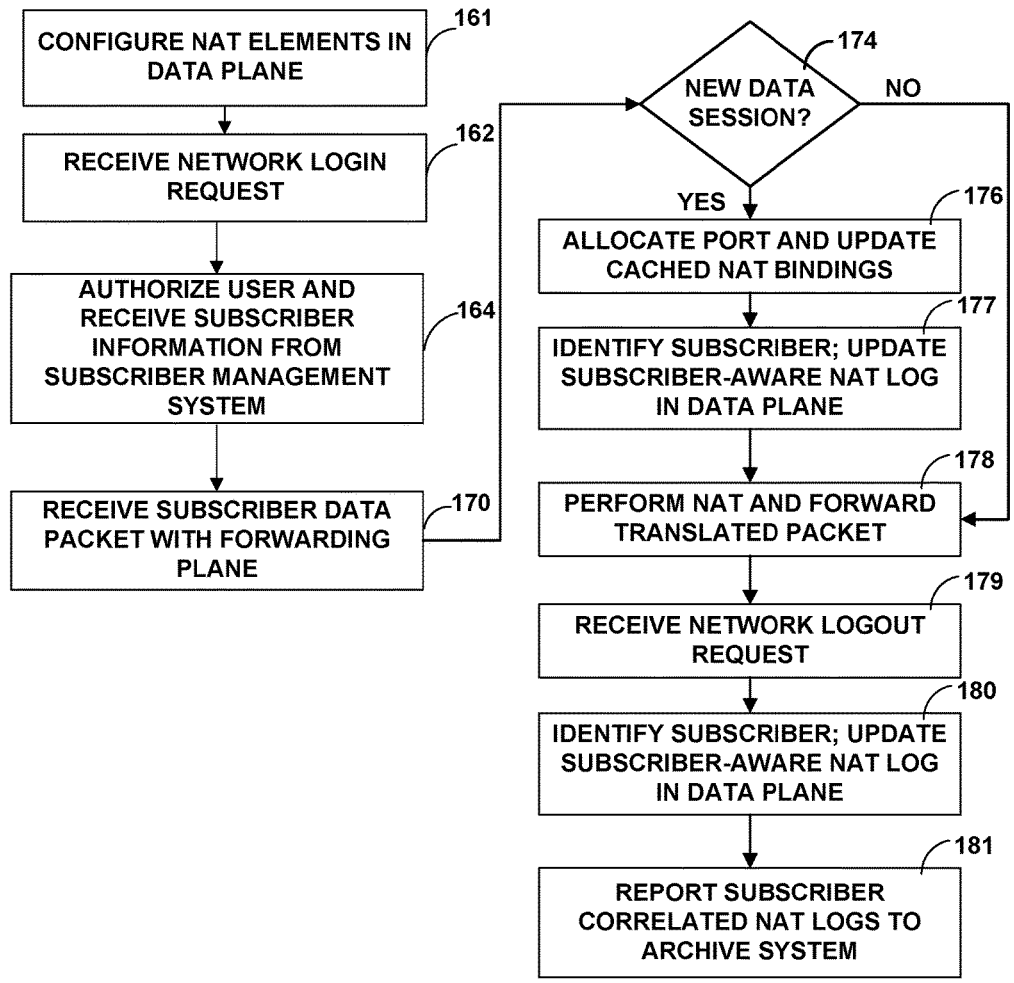
FIG. 3 is a flowchart illustrating an example of the network address translation (NAT) techniques described herein.

FIG. 3 is a flowchart illustrating an example embodiment of the inline network address translation (NAT) techniques described herein. Initially, such as during boot, service card controller 51 of control plane 19 configures respective NAT element 17 operable within service cards 10 to perform network address translation (161). Service card controller 51 may, for example, configure NAT element with one or more pools of network addresses (NAT pool 61) from which to allocate public network addresses when generating NAT bindings for newly detected packet flows. As additional examples, service card controller 51 may configure NAT element 17 to perform deterministic NAT where mappings between private/public IP addresses and ports are computed deterministically.

Subsequently, gateway router 32 receives a network login request from a device, such as CPE 18A, indicating that the device requires a packet-based network connection (162). Forwarding plane 15 of gateway router 32 forwards the request to subscriber management module 47 executing in control plane 19. In response, subscriber management service unit 10A typically communicates with a centralized subscriber management system for service provider network 10, (e.g., AAA server 30), to authenticate the subscriber and receive a private network address dynamically allocated for the subscriber and subscriber identification information used by the subscriber management system to identify the subscriber/customer (164).

Upon processing a packet for the network connection (170), NAT element 17 determines whether the packet is an outbound packet for a new data session (174). If so, NAT element 17 dynamically creates a NAT binding for the new communication session (176). At this time, NAT element 17 may access subscriber identification cache 53 to determine the subscriber identifier for the subscriber (e.g., customer) associated with the particular packet flow and inserts a record within NAT log cache 63 to record the NAT activity in a subscriber-aware manner, i.e., subscriber correlated record (177). In addition, NAT element 17 may at this time initiate a report timer for periodically sending NAT logs cached in the data plane for the subscriber.

Upon creating the NAT binding, or upon determining that the packet is associated with an existing NAT binding, NAT element 17 performs network address translation to translate the private source network address and source port within any outbound packet to the computed public network address and the assign port number (178). For an inbound packet, NAT element 17 reverse translates the public network address to the private network and port in accordance with the NAT binding. Unsolicited inbound packets destined for legitimate private network addresses having NAT profiles may result in NAT bindings in a similar manner or may be rejected by NAT element 17 in accordance with configuration data provided by subscriber management unit 10A, which may be conveyed by one or more flags within the NAT profile for a given subscriber.

Upon receiving a network logout request or upon inactivity on the data session for a threshold time (179), NAT element 17 frees the NAT binding, determines the subscriber identifier for the subscriber associated with the flow and updates the NAT log cache 63 to insert a record of the activity and subscriber identifier (180). At some point, e.g., based on expiration of a report timer or upon achieving a storage capacity trigger, NAT element 17 reports the pre-correlated NAT logs of NAT log cache 63 from data plane 15 to control unit 19 via agent 49 for communication to CGNAT archive 33 for long term storage (181).

Various embodiments of the invention have been described. These and other embodiments are within the scope of the following claims.

The invention claimed is:

1. A method comprising:
   receiving, with a router, a network access request from a subscriber device of a service provider network, wherein the subscriber device is associated with a subscriber of the service provider network;
   upon authenticating the subscriber, installing a subscriber identifier within a service unit of a data plane of the router, wherein the subscriber identifier uniquely identifies the specific subscriber from a plurality of subscribers of the service provider network;
   after authenticating the subscriber and installing the subscriber identifier within the service unit of the data plane, receiving a packet flow associated with the subscriber device;
   performing, by a network address translation (NAT) element within the service unit of the data plane of the router, one or more NAT operations by dynamically selecting, upon receiving an initial packet of the packet flow, a public network address and a port within a port range and creating a NAT binding that maps a private network address for the subscriber device to the public network address and the selected port;
   generating, within the service unit of the data plane of the router, one or more records logging the NAT operations, wherein the one or more records correlate the NAT operations with the subscriber by specifying the subscriber identifier, the public network address, and the port that were selected for the subscriber and the private network address that is currently being used by the subscriber device; and
   outputting the one or more records from the data plane of the router to an archive system.

2. The method of claim 1,
   wherein performing the one or more NAT operations comprises deallocating the NAT binding and returning the public network address and port specified by the NAT binding to a pool of unallocated public network addresses and ports, and
   wherein generating the one or more records logging the NAT operations comprises generating a record that specifies the subscriber identifier, the public network address and port that were deallocated.

3. The method of claim 2, wherein the subscriber identifier is different from the private network address allocated to the subscriber device.

4. The method of claim 1, wherein the subscriber identifier comprises an identifier stored within a subscriber database of an AAA server of the service provider network.

5. The method of claim 1, further comprising caching the records within the service unit of the data plane of the router, wherein outputting the records comprises reporting, responsive to a triggering event, the cached records from the service unit to the archive system for long term storage.

6. The method of claim 5, wherein the triggering event comprises one of a current time of day, a number of records cached within the service unit, a periodic timer, or a request from the archive system.

7. A router comprising:
   a data plane having packet forwarding hardware configured to forward transit packets and at least one service unit coupled to the packet forwarding hardware;
   a control unit configured to receive a network access request from a subscriber device of a service provider network and authenticate a subscriber associated with the subscriber device,
   wherein, upon authenticating the subscriber, the control unit is configured to install a subscriber identifier within a service unit of a data plane of the router, the subscriber identifier uniquely identifying the specific subscriber from a plurality of subscribers of the service provider network,
   wherein the control unit is configured to receive, after authenticating the subscriber and installing the subscriber identifier within the service unit of the data plane, a packet flow associated with the subscriber device,
   wherein the service unit of the data plane of the router is configured to:
      perform one or more network address translation (NAT) operations by dynamically selecting, upon receiving an initial packet of the packet flow, a public network address and a port within a port range and creating a NAT binding that maps a private network address for the subscriber device to the public network address and the selected port;
      generate, within the service unit of the data plane of the router, one or more records logging the NAT operations, wherein the one or more records correlate the NAT operations with the subscriber by specifying the subscriber identifier, the public network address, and the port that were selected for the subscriber and the private network address that is currently being used by the subscriber device; and output the one or more records from the data plane of the router to an archive system.

8. The router of claim 7,
wherein to perform the one or more NAT operations, the service unit of the data plane of the router is configured to deallocate the NAT binding and returning the public network address and port specified by the NAT binding to a pool of unallocated public network addresses and ports, and
wherein to generate the one or more records logging the NAT operations, the service unit is configured to generate a record that specifies the subscriber identifier, the public network address and port that were deallocated.

9. The router of claim 7, wherein the subscriber identifier is different from the private network address allocated to the subscriber device.

10. The router of claim 7, wherein the subscriber identifier comprises an identifier stored within a subscriber database of an AAA server of the service provider network.

11. The router of claim 7, further comprising a cache within the service unit configured to store the records, wherein the router is configured to report, responsive to a triggering event, the records from the service unit to the archive system for long term storage.

12. The router of claim 11, wherein the triggering event comprises one of a current time of day, a number of records cached within the service unit, a periodic timer or a request from the archive system.

13. A system comprising:
a network configured to provide a plurality of subscriber devices access to a public network, wherein the subscriber devices are associated with respective subscribers;
a subscriber management system comprising a subscriber database having profiles for each of the subscribers, wherein each of the subscribers is uniquely identified in the subscriber management system by a corresponding subscriber identifier;
an archive system that stores records of network address translation (NAT) operations performed on packet flows within the network, wherein the records stored by the archive system are correlated with the subscriber identifiers such that each of NAT operations specified by the records can be associated with a respective one of subscribers;
a router deployed within the network, wherein the router is configured to:
receive a network access request from a subscriber device of a service provider network, wherein the subscriber device is associated with a subscriber of the service provider network;
upon authenticating the subscriber with the subscriber management system, install the subscriber identifier of the subscriber within a service unit of a data plane of the router;
after authenticating the subscriber and installing the subscriber identifier within the service unit of the data plane, receive a packet flow associated with the subscriber device;
perform, using a NAT element within the service unit of the data plane of the router, one or more NAT operations by dynamically selecting, upon receiving an initial packet of the packet flow, a public network address and a port within a port range and creating a NAT binding that maps a private network address for the subscriber device to the public network address and the selected port;
generate, within the service unit of the data plane of the router, one or more records logging the NAT operations, wherein the one or more records correlate the NAT operations with the subscriber by specifying the subscriber identifier, the public network address, and the port that were selected for the subscriber and the private network address that is currently being used by the subscriber device; and
output the one or more records from the data plane of the router to the archive system.

14. The system of claim 13,
wherein to perform the one or more NAT operations, the service unit of the data plane of the router is configured to deallocate the NAT binding and returning the public network address and port specified by the NAT binding to a pool of unallocated public network addresses and port, and
wherein to generate the one or more records logging the NAT operations, the service unit is configured to generate a second record that specifies the subscriber identifier, the public network address and port that were deallocated.

15. The system of claim 13, wherein the subscriber identifier is different from the private network address allocated to the subscriber device.

16. The system of claim 13, wherein the subscriber identifier comprises an identifier stored within a subscriber database of an AAA server of the service provider network.

* * * * *